United States Patent
Gwilliams et al.

(10) Patent No.: US 12,316,665 B2
(45) Date of Patent: May 27, 2025

(54) CYBER SECURITY ASSURANCE USING 4D THREAT MAPPING OF CRITICAL CYBER ASSETS

(71) Applicant: Saudi Arabian Oil Company, Dhahran (SA)

(72) Inventors: John Gwilliams, Dhahran (SA); Sultan Saadaldean Alsharif, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 334 days.

(21) Appl. No.: 17/650,808

(22) Filed: Feb. 11, 2022

(65) Prior Publication Data
US 2023/0262084 A1    Aug. 17, 2023

(51) Int. Cl.
G06Q 10/0635    (2023.01)
G06F 21/57    (2013.01)
H04L 9/40    (2022.01)

(52) U.S. Cl.
CPC .............................. H04L 63/1433 (2013.01)

(58) Field of Classification Search
CPC ...... G06F 21/54; G06F 21/554; G06F 21/566; G06F 21/577; G06F 21/44; H04L 63/1433
See application file for complete search history.

(56) References Cited

U.S. PATENT DOCUMENTS

| | | | |
|---|---|---|---|
| 9,009,084 B2 | 4/2015 | Brandt et al. | |
| 10,754,506 B1* | 8/2020 | Moyal | G06F 3/04842 |
| 11,777,992 B1* | 10/2023 | Cross | H04L 63/0876 726/5 |
| 2004/0095349 A1* | 5/2004 | Bito | G06V 10/945 345/440 |
| 2008/0282320 A1* | 11/2008 | DeNovo | G06F 21/604 726/1 |
| 2010/0275263 A1* | 10/2010 | Bennett | G06F 21/577 345/589 |

(Continued)

FOREIGN PATENT DOCUMENTS

| | | | | |
|---|---|---|---|---|
| EP | 3065076 A1 * | 9/2016 | | G05B 19/0428 |
| KR | 20190083174 | 11/2019 | | |

OTHER PUBLICATIONS

Author Unknown, "Cyber Resilience Review (CRR)", US Department of Homeland Security CISA, Published Apr. 2020 (Year: 2020).*

(Continued)

*Primary Examiner* — Carl G Colin
*Assistant Examiner* — Habibullah
(74) *Attorney, Agent, or Firm* — Fish & Richardson P.C.

(57) ABSTRACT

Systems and methods include a computer-implemented method for presenting a model of cybersecurity. Questionnaire answers corresponding to individual components of each of three elements contributing to cybersecurity risk and maturity for a computer system are received by a four-dimensional cybersecurity assurance model application. Three scores corresponding to dimensions of cybersecurity assurance for the computer system are generated by the four-dimensional cybersecurity assurance model application using the questionnaire answers. A three-dimensional graph presenting a four-dimensional model of cybersecurity assurance for the computer system is generated by the four-dimensional cybersecurity assurance model application using the three scores and temporal information.

20 Claims, 2 Drawing Sheets

(56) References Cited

U.S. PATENT DOCUMENTS

| | | | |
|---|---|---|---|
| 2011/0277034 A1 | 11/2011 | Hanson | |
| 2012/0180133 A1* | 7/2012 | Al-Harbi | H04L 63/1433 |
| | | | 726/25 |
| 2014/0137257 A1* | 5/2014 | Martinez | H04L 63/1433 |
| | | | 726/25 |
| 2015/0088597 A1 | 3/2015 | Doherty et al. | |
| 2015/0356477 A1* | 12/2015 | Milkman | G06Q 10/0633 |
| | | | 705/7.27 |
| 2017/0126741 A1 | 5/2017 | Lang et al. | |
| 2020/0065727 A1* | 2/2020 | Connell | G06Q 10/087 |
| 2020/0273046 A1* | 8/2020 | Biswas | G06N 3/08 |
| 2021/0297441 A1* | 9/2021 | Olalere | H04L 63/1408 |
| 2022/0400135 A1* | 12/2022 | Gamra | H04L 63/1433 |
| 2023/0156031 A1* | 5/2023 | Subramanian | H04L 63/14 |
| | | | 726/25 |

OTHER PUBLICATIONS

John Chambers / John Thompson, "Common Vulnerability Scoring System", National Infrastructure Advisory Council, Published Oct. 12, 2004 (Year: 2004).*

Author Unknown, "Building Cybersecurity Capability, Maturity, Resilience", Cmmi Institute, Published Dec. 13, 2017 (Year: 2017).*

Joshua Franklin et al., "CVSS Implementation Guidance", National Institute of Standards and Technology, Published Apr. 2014 (Year: 2014).*

Author Unknown, "Guide for Conducting Risk Assessments", National Institute of Standards and Technology, Published Sep. 2012 (Year: 2012).*

Authors: George Stergiopoulos, Dimitris A. Gritzalis, Evangelos Limnaios Cyber-Attacks on the Oil & Gas Sector: A Survey on Incident Assessment and Attack Patterns IEEE Access Published: Jul. 23, 2020 (Year: 2020).*

Authors: Siqi Hao, Shaowu Cheng, Yaping Zhang Title: "A multi-aircraft conflict detection and resolution method for 4-dimensional trajectory-based operation", Chinese Society of Aeronautics and Astronautics Published: May 15, 2018 (Year: 2018).*

Authors: Siqi Hao, Shaowu Cheng, Yaping Zhang Title: "Variable-Based Spatiotemporal Trajectory Data Visualization Illustrated", IEEE Access Published: Oct. 16, 2019 (Year: 2019).*

PCT International Search Report and Written Opinion in International Appln. No. PCT/US2023/012585, dated May 17, 2023, 13 pages.

* cited by examiner

CYBER SECURITY ASSURANCE USING 4D THREAT MAPPING OF CRITICAL CYBER ASSETS

TECHNICAL FIELD

The present disclosure applies to improving cybersecurity.

BACKGROUND

Traditional process verification steps used in cybersecurity typically include one or two steps to ensure that an existing process (or components of a process) are designed effectively and operating effectively. This limited verification process may not always provide the correct level of assurance when critical security controls need to be verified.

SUMMARY

The present disclosure describes techniques that can be used for improving cybersecurity assurance using four-dimensional (4D) threat mapping of critical cyber assets. In some implementations, a computer-implemented method includes the following. Questionnaire answers corresponding to individual components of each of three elements contributing to cybersecurity risk and maturity for a computer system are received by a four-dimensional cybersecurity assurance model application. Three scores corresponding to dimensions of cybersecurity assurance for the computer system are generated by the four-dimensional cybersecurity assurance model application using the questionnaire answers. A three-dimensional graph presenting a four-dimensional model of cybersecurity assurance for the computer system is generated by the four-dimensional cybersecurity assurance model application using the three scores and temporal information.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. A comprehensive template can be provided for analyzing compliance to applicable controls, which can provide clarity in demonstrating improvements through visualization of trends over time. A platform (e.g., a Python platform) can be constructed that integrates a series of inputs from applicable control statuses, and logged in a local database. Once answers have been provided for each of people, process (or documentation), and technology checks, code in the platform can determine final scores for tP.Total, tD.Total and tT.Total. Then, tools of a math library (e.g., the matplotlib 3D library) can be used to create a graphical representation and calculate an overall cybersecurity status. Test cases can be applied to compliance exercises, using code and algorithms that are not tied to underlying technologies being tested. Conventional solutions in the industry typically apply a two-dimensional analysis, for example, taking a single question set and applying a red-amber-green (RAG) status based on a single set of responses or technical tests. However, using techniques of the present disclosure, a combination of tests can be applied, scoring each element independently and then aligning the results in a 3D representation not available in conventional techniques. The 3D representation can use existing agents and processes, providing an offline analytical and decision making engine that does not introduce the need for further agents or software to be installed on a target system. The algorithms' test conditions can be adjusted to a given organization's processes and required technical controls. Test conditions defining input variables and boundary conditions can be adjusted to meet individual corporate risk models using calculations that can be validated to ensure consistent results. This can lead to improved visibility of compliance and security, including trends over time. This can also help to improve C-Suite (or chief suite, including chief executive officer and/or chief operating officer) visibility of organizational threat, enabling better management decisions to improve organizational security controls. The techniques can provide the ability for greater automation of compliance testing and reduction in manpower overheads.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for improving cybersecurity assurance using four-dimensional (4D) threat mapping of critical cyber assets. Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Techniques of the present disclosure can provide for a method and a model to assess and represent cybersecurity control efficiency through the representation of the results of a series of complex assessments. The results can be algorithmically converted into data sets that can be modeled against three different vectors (people, process/documentation, and technology) and then tracked over time, resulting in a 4D model for tracking cybersecurity assurance activities. This can result in a detailed assurance model that can provide a visual representation of the level of security assurance of a given asset or set of assets, where such assets are required to adhere to specific cybersecurity controls.

Introduction

Within any security assessment environment, clear scoring and representation of current and previous process verification scores can be essential in clearly articulating threats introduced by systems and how a corresponding threat model adjusts over time. The present disclosure provides techniques and an algorithm for accurately scoring all aspects of a target system by following a series of scorable tests and using a threat-based testing process that is a function of a People threat (tP), a Process/Documentation threat (tD), and a Technology Implementation threat (tT) over time.

Figure 1:
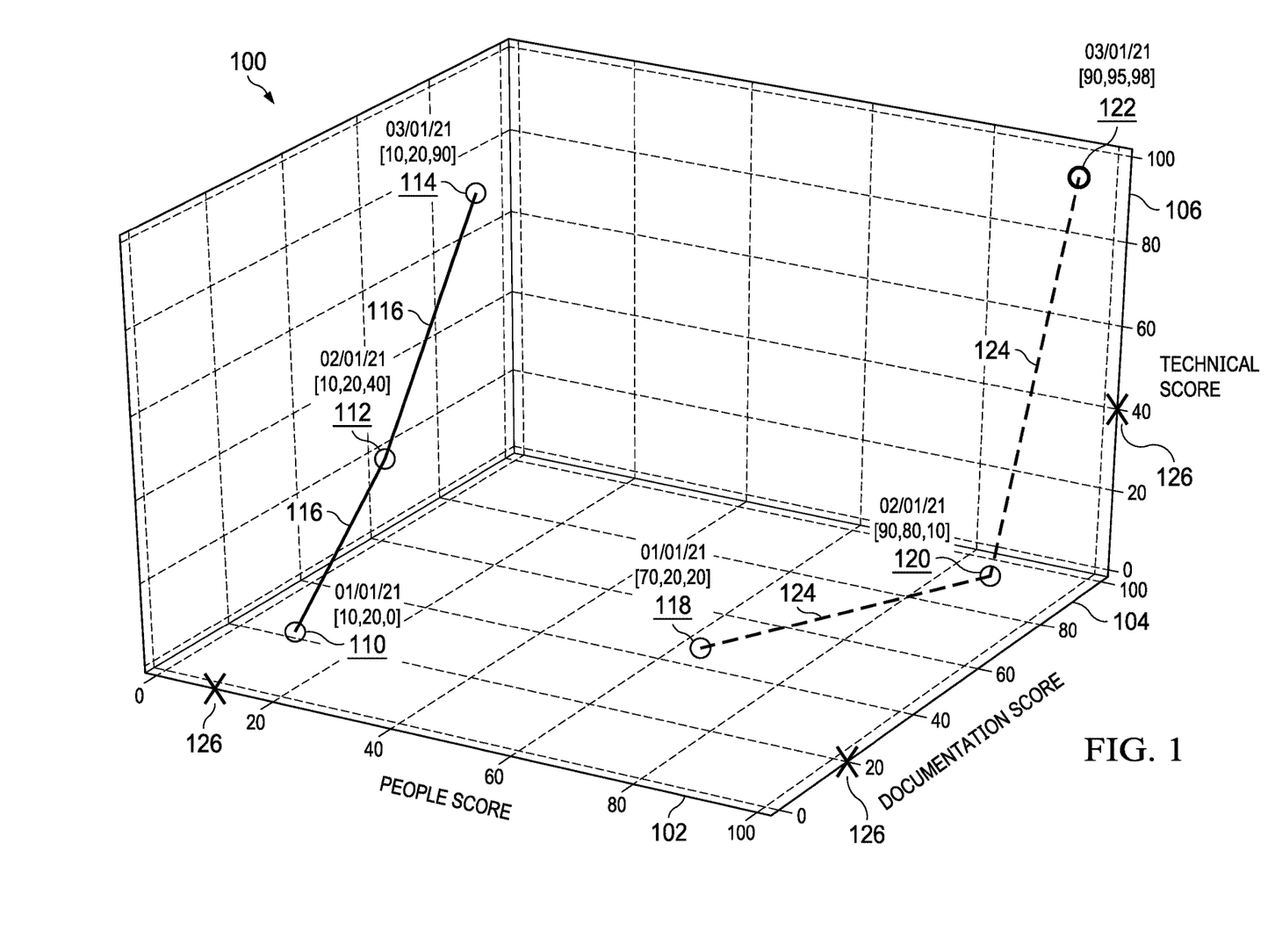
FIG. 1 is a three-dimensional graph on which vectors and a time element provide a four-dimensional model of cybersecurity assurance, according to some implementations of the present disclosure.

The results from the threat test sets are then converted to individual scores: tPr, tDr, tTr, that can be calculated within a 0-100 range. These results are then mapped onto the (x,y,z) axes a 3-vector graph (e.g., FIG. 1) where:

$$x = tPr \quad (1)$$

$$y = tDr \quad (2)$$

$$z = tTr \quad (3)$$

Testing People (tP)

The tP and tPr are related to people or personnel. A critical part of any assurance process is understanding that the personnel who are responsible for all aspects of the system and supporting systems are skilled in, and aware of, relevant security procedures that are related to the target systems with which the personnel are associated.

For example, a system that is responsible for credit card information needs to adhere to payment card industry (PCI) standards. As such, security personnel, designers, implementers, operators, and (sometimes) users are expected to have certain degrees of knowledge about PCI standards and requirements to ensure that the system operates with the confines of PCI requirements. Typically, complex systems need to adhere to one or more multiple standards that fall into the following types: 1) internal standards, 2) internal technical guidelines, 3) internal procedures, 4) international standards, and 5) best practices.

Through the application of a series of applicable interview questions, key personnel responsible for core aspects of the target system are assessed to determine what level of competence they can evidence for all relevant topics. The series of questions can be graded against the following metrics:

TABLE 1

| \multicolumn{2}{c}{Grading Results} | |
|---|---|
| Result | Description |
| 0 | No knowledge of topic |
| 1 | Aware of topic but not able to provide details |

TABLE 1-continued

| Grading Results | |
|---|---|
| Result | Description |
| 2 | Partially aware of details of topic |
| 3 | Fully aware of the topic |

The combination of questions is represented by the following matrix.

TABLE 2

| Presented Questions | | |
|---|---|---|
| Question Number | Description | Numerical Result |
| tP.q(1) | Question 1 | 0 \| 1 \| 2 \| 3 |
| tP.q(2) | Question 2 | 0 \| 1 \| 2 \| 3 |
| tP.q(3) | Question 3 | 0 \| 1 \| 2 \| 3 |
| ... | ... | ... |
| tP.q(y-1) | Question (y-1) | 0 \| 1 \| 2 \| 3 |
| tP.q(y) | Question (y) | 0 \| 1 \| 2 \| 3 |

The cumulative score for this phase is calculated in multiple steps. First, the algorithm can dynamically determine a maximum score possible based on the total number of questions (y), multiplied by the maximum individual score of 3. This is represented as tP.Max For example, if y=10, then tP.Max=y*3=30. For increasing values of y, tP.Max increases comparably.

The results (of the individual scores 0-3) are summed to provide tP.Total. Then, tP.Total is divided by tp.Max, and the result is multiplied by 100 to get a score out of 100, referred to as tP.Score. This is represented by the following algorithm:

$$tP.Score = 100 * \left( \frac{\left( \sum_{i=1}^{y} tp.q(i) \right)}{tp.Max} \right) \quad (4)$$

The result tP.Score (a percentage from 0 to 100) is assigned to Vector x (or the x-axis) on the presentation graph (e.g., in FIG. 1).

Evaluating Process Documentation (tD)

For every related process document identified in the test people phase, a subset of assessments is required. Documents in this case are documents used by the people to help in performing security-related tasks. The total number of Assessments==total number of Process Documents. For each Assessment the total number of control checks==total number of controls in Process Document. Examples of a control include: 1) "Verify that the address starts with HTTPS and not HTTP." 2) "Is HSTS configured on Web Interface?" 3) "Have default passwords been removed?" 4) "Have SSL 2.0, SSL 3.x, and TLS 1.0/1.1 been disabled?" 5) "Have weaker hashing functions such as SHA-1 been disabled?" and 6) "Have unnecessary TCP/IP and UDP/IP services been removed?" Each check can be assessed and scored based on the following metric.

TABLE 3

Scoring Results

| Result | Description |
|---|---|
| 0 | No Process Document |
| 1 | Document Exists but is mostly incomplete |
| 2 | Document Exists and is mostly complete |
| 3 | Complete Process Document Exists |

This results in a series of verifiable control checks that are represented in the following table.

TABLE 4

Verifiable Control Checks

| Assessment Code | Process Document | Control Check | Unique ID | Possible Score |
|---|---|---|---|---|
| A1 | Document 1 | c(1) | A1.c(1) | 0 \| 1 \| 2 \| 3 |
|  |  | c(2) | A1.c(2) | 0 \| 1 \| 2 \| 3 |
|  |  | c( . . . ) | A1.c( . . . ) | 0 \| 1 \| 2 \| 3 |
|  |  | c(v) | A1.c(v) | 0 \| 1 \| 2 \| 3 |
| A2 | Document 2 | c(1) | A2.c(1) | 0 \| 1 \| 2 \| 3 |
|  |  | c(2) | A2.c(2) | 0 \| 1 \| 2 \| 3 |
|  |  | c( . . . ) | A2.c( . . . ) | 0 \| 1 \| 2 \| 3 |
|  |  | c(w) | A2.c(w) | 0 \| 1 \| 2 \| 3 |
| A . . . | Document . . . | c(1) | A . . . c(1) | 0 \| 1 \| 2 \| 3 |
|  |  | c(z) | A . . . c(z) | 0 \| 1 \| 2 \| 3 |
| Ax | Document x | c(1) | Ax.c(1) | 0 \| 1 \| 2 \| 3 |
|  |  | c(2) | Ax.c(2) | 0 \| 1 \| 2 \| 3 |
|  |  | c( . . . ) | Ax.c( . . . ) | 0 \| 1 \| 2 \| 3 |
|  |  | c(y) | Ax.c(y) | 0 \| 1 \| 2 \| 3 |

The results of these Control Checks are calculated using the following algorithm, for each Ax.

$$A1.\text{Total} = \sum\nolimits_{j=1}^{v} A1.c(j) \quad (5)$$

$$A2.\text{Total} = \left(\sum\nolimits_{k=1}^{v} A2.c(w)\right) \quad (6)$$

$$A \ldots \text{Total} = \left(\sum\nolimits_{j=1}^{v} Ai.c(z)\right) \quad (7)$$

$$Ax.\sum\nolimits_{m=1}^{v} Ax.c(m) \quad (8)$$

$$A1.\text{Score} = 100 * \left(\frac{A1.\text{Total}}{A1.\text{Max}}\right) \quad (9)$$

$$A2.\text{Score} = 100 * \left(\frac{A2.\text{Total}}{A2.\text{Max}}\right) \quad (10)$$

$$A \ldots \text{Score} = 100 * \left(\frac{A \ldots \text{Total}}{A \ldots \text{Max}}\right) \quad (11)$$

$$Ax.\text{Score} = 100 * \left(\frac{Ax.\text{Total}}{Ax.\text{Max}}\right) \quad (12)$$

The final score out of 100 is calculated by summing the Ax.Score values together and dividing by the total number of documents, 'x'.

$$tD.\text{Total} = \frac{A1.\text{Total} + A2.\text{Total} + A \ldots \text{Total} + Ax.\text{Total}}{x} \quad (13)$$

The tD.Total value is assigned to Vector y (or the y-axis) on the presentation graph (e.g., in FIG. 1).

Technical Test Cases (tT)

The Process Test Cases are denominated by the set of test cases {t1, t2, t3, . . . , t(y−1), t(y)}, where each test relates to a specific testable control identified from the prior two stages. The test cases can each be described with a specific testable condition and can have a Pass or Fail result. A Pass results in a positive increment to the overall assessment score, such that for a given number of test cases (y), the Score (tT.Score) is derived by a simple addition of the numerical result from each test case. This is described in the following table:

TABLE 5

Numerical Results

| Test Number | Description | Possible Test Result | Numerical Result |
|---|---|---|---|
| t(1) | Test Scenario 1 | Pass \| Fail | 1 \| 0 |
| t(2) | Test Scenario 2 | Pass \| Fail | 1 \| 0 |
| t(3) | Test Scenario 3 | Pass \| Fail | 1 \| 0 |
| . . . | . . . | . . . | . . . |
| t(y-1) | Test Scenario (y-1) | Pass \| Fail | 1 \| 0 |
| t(y) | Test Scenario (y) | Pass \| Fail | 1 \| 0 |

From this subset of test cases, the tT.Score can be calculated simply as:

$$tT.\text{Score} = \sum\nolimits_{i=1}^{y} t(i) \quad (14)$$

The total (tT.Total), scaled to 100, can be calculated by the following algorithm:

$$tT.\text{Total} = 100 \left(\frac{tT.\text{Score}}{y}\right) \quad (15)$$

The tT.Total value is assigned to Vector z (or the z-axis) on the presentation graph (e.g., in FIG. 1).

Temporal Data

As repeat readings are taken, a temporal factor is included in the representation to show trend over time to demonstrate improvements in the security configuration of the target system. The data set can be represented in the following table.

TABLE 6

Trends Over Time

| System | Date | Tp.Total | tD.Total | tT.Total |
|---|---|---|---|---|
| System A | Jan. 1, 2021 | 0-100 | 0-100 | 0-100 |
| System A | Feb. 1, 2021 | 0-100 | 0-100 | 0-100 |
| System A | Mar. 1, 2021 | 0-100 | 0-100 | 0-100 |
| System B | Jan. 2, 2021 | 0-100 | 0-100 | 0-100 |
| System B | Feb. 2, 2021 | 0-100 | 0-100 | 0-100 |
| System B | Mar. 2, 2021 | 0-100 | 0-100 | 0-100 |

This data can then be plotted on the 3D graph (e.g., FIG. 1), adding a $4^{th}$ temporal dimension which visualizes the trend analytics.

Once the 3 vectors, tP.Total, tD.Total and tT.Total, have been calculated and the Temporal value added, they are plotted on s 3D graph and associated with previous related data sets, demonstrating trend over time together with current status.

Graphical Representation

FIG. 1 is a three-dimensional graph 100 on which vectors and a time element provide a four-dimensional model of cybersecurity assurance, according to some implementations of the present disclosure. Elements plotted on the graph 100 are plotted relative to a people score 102 (based on tP.Total), a documentation score 104 (based on tD.Total), and a technical score 106 (based on tT.Total).

In a first example, points 110, 112, and 114, representing tP.Total, tD.Total and tT.Total scores over time (and annotated with the scores and dates) are connected by lines 116. As such, a score progression includes [10,20,0] on Jan. 1, 2021, [10,20,40] on Feb. 1, 2021, and [10,20,90] on Mar. 1, 2021. This progression can represent a first System 1, for example.

In a second example, points 118, 120, and 122, representing tP.Total, tD.Total and tT.Total scores over time (and annotated with the scores and dates) are connected by lines 124. As such, a score progression includes [70,20,20] on Jan. 1, 2021, [90,80,10] on Feb. 1, 2021, and [90,95,98] on Mar. 1, 2021. This progression can represent a first System 2, for example. As the scores for System 2 are much greater than the scores of System 1, System 2 can be said to have a much greater cybersecurity assurance. In general, a greater distance d of a point from the 0,0,0 point on the graph 100 indicates a greater cybersecurity assurance.

In some implementations, the graph 100 can be animated to allow alternate views of the data set to better visualize areas of improvements or deficits in the controls. In some implementations, markings (such as hashed lines or on-axis markings), can be used in the graph 100 to aid in visualizing a plotted point's score and position relative to each of the three axes. The markings can be invoked, for example, by clicking on or hovering over particular points, or by selecting an option to display the markings. For example, selecting point 112 can cause X-markings 126 to be displayed, corresponding to the [10,20,40] score. An animation of a system's scores over time can include movements of the markings 126, with the movements being coordinated, for example, with highlighting of specific points. The animation can be initiated for example, by clicking on the line 116.

RAG Rating Boundaries

Once the data has been generated, the graph 100 can be annotated with a meaningful RAG rating to define the level of threat or risk that the system poses. With a 4D model, each factor can be weighted differently such that control areas that are more important can have higher criteria for crossing into a positive (green) condition. For example, point 122 can be presented as a green dot, while the other points 110, 112, 114, 118, and 120 (with lower scores) can be presented using red dots.

The percentages can then be used against a pre-defined set of boundary or threshold conditions to determine the RAG rating of a given asset. These boundary conditions can be defined based on an organization's risk profiles. Example pseudocode is provided simply to illustrate one type control, with the following snippet of pseudo code providing a computational analysis of the boundary conditions:

```
#Adjustable boundary levels for differentiating between
#Red to Amber (.low values) and Amber to Green (.high
    values).
   tD.low=50
   tD.high=80
   tP.low=50
   tP.high=80
   tT.low=50
   tT.high=80
#Decision making rule that defines resulting RAG status
    for the system
   if   tD.Total<tD.low   and   tP.Total<tP.low   and
       tT.local<tT.low rag.status='Red'
   else if tD.Total>tD.high and tP.Total>tP.high and
       tT.total>tT.high rag.status='Green'
   else rag.status='Amber'
```

Figure 2:
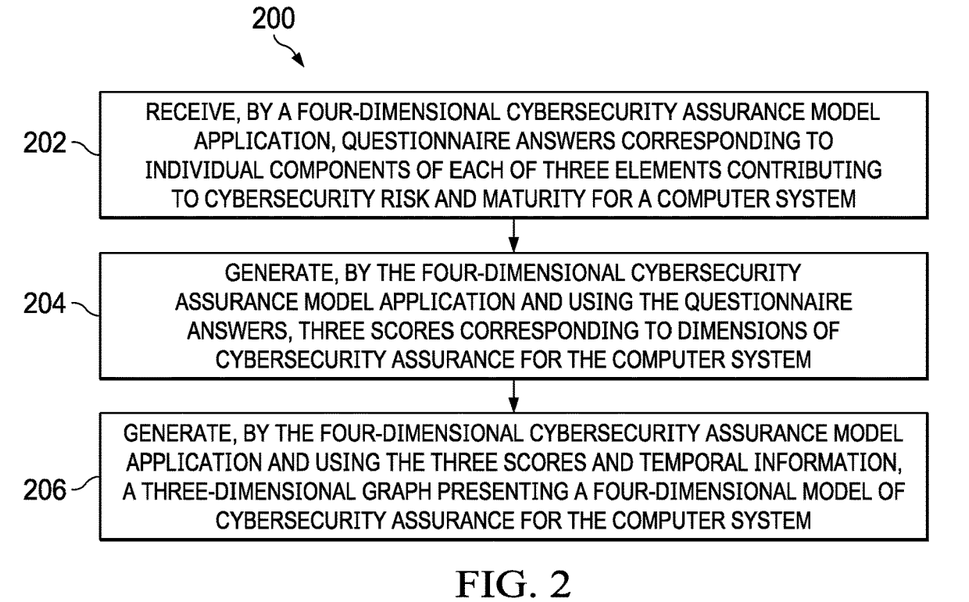
FIG. 2 is a flowchart of an example of a method for generating a three-dimensional (3D) graph presenting a four-dimensional model of cybersecurity assurance for the computer system according to some implementations of the present disclosure.

FIG. 2 is a flowchart of an example of a method 200 for generating a three-dimensional graph presenting a four-dimensional model of cybersecurity assurance for the computer system according to some implementations of the present disclosure. For clarity of presentation, the description that follows generally describes method 200 in the context of the other figures in this description. However, it will be understood that method 200 can be performed, for example, by any suitable system, environment, software, and hardware, or a combination of systems, environments, software, and hardware, as appropriate. In some implementations, various steps of method 200 can be run in parallel, in combination, in loops, or in any order.

At 202, questionnaire answers corresponding to individual components of each of three elements contributing to cybersecurity risk and maturity for a computer system are received by a four-dimensional cybersecurity assurance model application. As an example, the questionnaire answers can include numeric grades for different aspects of a document. From 202, method 200 proceeds to 204.

At 204, three scores corresponding to dimensions of cybersecurity assurance for the computer system are generated by the four-dimensional cybersecurity assurance model application using the questionnaire answers. The three the three scores include the following. A people threat (tP) score indicates a readiness of personnel responsible for cybersecurity of the computer system, including a level that personnel are skilled in and aware of relevant security procedures for the computer system. A process documentation threat (tD) score indicates a level of an existence and a completeness of process documentation defining processes used by the personnel tasked with the cybersecurity assurance for the computer system. A technology implementation threat (tT) score is based on specific testable control and test cases identified for use by the personnel and using the process documentation. For example, the questionnaire answers and the people threat (tP) score are based on a person's knowledge of a cybersecurity assurance topic. The questionnaire answers and the process documentation threat (tD) score can be based on a person's knowledge of a cybersecurity assurance topic. The questionnaire answers can include numeric grades for no process document, document exists but is mostly incomplete, document exists and is mostly complete, and complete process document exists. The questionnaire answers and the technology implementation threat (tT) score can be based on passing or failing a test case. From 204, method 200 proceeds to 206.

At 206, a three-dimensional graph presenting a four-dimensional model of cybersecurity assurance for the computer system is generated by the four-dimensional cybersecurity assurance model application using the three scores and temporal information. The three-dimensional graph presenting the four-dimensional model of cybersecurity assurance for the computer system can include points plotted relative to a people axis, a process documentation axis, and a technology implementation axis, and where the points are annotated with the three scores and a time element.

In some implementations, an animation of information presented in the three-dimensional graph can be provided to improve visualization of information relative to the people axis, the process documentation axis, and the technology implementation axis, where the animation animates a change in the cybersecurity assurance for the computer system over time. After 206, method 200 can stop.

In some implementations, in addition to (or in combination with) any previously-described features, techniques of the present disclosure can include the following. Customized user interfaces can present intermediate or final results of the above described processes to a user. The presented information can be presented in one or more textual, tabular, or graphical formats, such as through a dashboard. The information can be presented at one or more on-site locations (such as at an oil well or other facility), on the Internet (such as on a webpage), on a mobile application (or "app"), or at a central processing facility. The presented information can include suggestions, such as suggested changes in parameters or processing inputs, that the user can select to implement improvements in a production environment relating to Real-time Cyber-Security key process indicators (KPIs), testing methodologies, and scheduling. For example, the suggestions can include parameters that, when selected by the user, can cause a change or an improvement in cyber-security controls. The suggestions, when implemented by the user, can improve the speed and accuracy of calculations, streamline processes, improve models, and solve problems related to efficiency, performance, safety, reliability, costs, downtime, and the need for human interaction. In some implementations, the suggestions can be implemented in real-time, such as to provide an immediate or near-immediate change in operations or in a model. The term real-time can correspond, for example, to events that occur within a specified period of time, such as within one minute or within one second. In some implementations, values of parameters or other variables that are determined can be used automatically (such as through using rules) to implement changes in automated cyber-security controls, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 3:
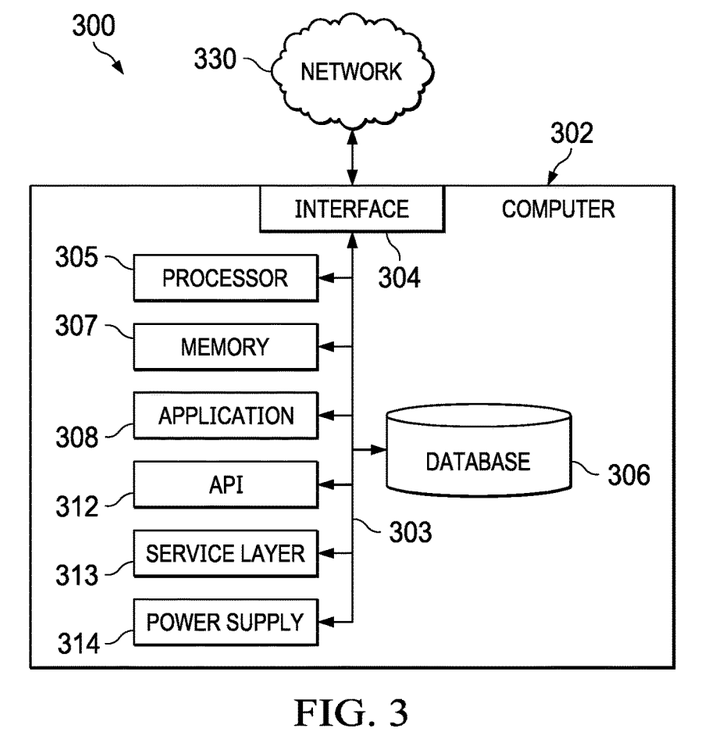
FIG. 3 is a block diagram illustrating an example computer system used to provide computational functionalities associated with described algorithms, methods, functions, processes, flows, and procedures as described in the present disclosure, according to some implementations of the present disclosure.

FIG. 3 is a block diagram of an example computer system 300 used to provide computational functionalities associated with described algorithms, methods, functions, processes, flows, and procedures described in the present disclosure, according to some implementations of the present disclosure. The illustrated computer 302 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 302 can include input devices such as keypads, keyboards, and touch screens that can accept user information. Also, the computer 302 can include output devices that can convey information associated with the operation of the computer 302. The information can include digital data, visual data, audio information, or a combination of information. The information can be presented in a graphical user interface (UI) (or GUI).

The computer 302 can serve in a role as a client, a network component, a server, a database, a persistency, or components of a computer system for performing the subject matter described in the present disclosure. The illustrated computer 302 is communicably coupled with a network 330. In some implementations, one or more components of the computer 302 can be configured to operate within different environments, including cloud-computing-based environments, local environments, global environments, and combinations of environments.

At a top level, the computer 302 is an electronic computing device operable to receive, transmit, process, store, and manage data and information associated with the described subject matter. According to some implementations, the computer 302 can also include, or be communicably coupled with, an application server, an email server, a web server, a caching server, a streaming data server, or a combination of servers.

The computer 302 can receive requests over network 330 from a client application (for example, executing on another computer 302). The computer 302 can respond to the received requests by processing the received requests using software applications. Requests can also be sent to the computer 302 from internal users (for example, from a command console), external (or third) parties, automated applications, entities, individuals, systems, and computers.

Each of the components of the computer 302 can communicate using a system bus 303. In some implementations, any or all of the components of the computer 302, including hardware or software components, can interface with each other or the interface 304 (or a combination of both) over the system bus 303. Interfaces can use an application programming interface (API) 312, a service layer 313, or a combination of the API 312 and service layer 313. The API 312 can include specifications for routines, data structures, and object classes. The API 312 can be either computer-language independent or dependent. The API 312 can refer to a complete interface, a single function, or a set of APIs.

The service layer 313 can provide software services to the computer 302 and other components (whether illustrated or not) that are communicably coupled to the computer 302. The functionality of the computer 302 can be accessible for all service consumers using this service layer. Software services, such as those provided by the service layer 313, can provide reusable, defined functionalities through a defined interface. For example, the interface can be software written in JAVA, C++, or a language providing data in extensible markup language (XML) format. While illustrated as an integrated component of the computer 302, in alternative implementations, the API 312 or the service layer 313 can be stand-alone components in relation to other components of the computer 302 and other components communicably coupled to the computer 302. Moreover, any or all parts of the API 312 or the service layer 313 can be implemented as child or sub-modules of another software module, enterprise application, or hardware module without departing from the scope of the present disclosure.

The computer 302 includes an interface 304. Although illustrated as a single interface 304 in FIG. 3, two or more interfaces 304 can be used according to particular needs, desires, or particular implementations of the computer 302 and the described functionality. The interface 304 can be used by the computer 302 for communicating with other systems that are connected to the network 330 (whether illustrated or not) in a distributed environment. Generally, the interface 304 can include, or be implemented using, logic encoded in software or hardware (or a combination of software and hardware) operable to communicate with the network 330. More specifically, the interface 304 can include software supporting one or more communication protocols associated with communications. As such, the network 330 or the interface's hardware can be operable to communicate physical signals within and outside of the illustrated computer 302.

The computer 302 includes a processor 305. Although illustrated as a single processor 305 in FIG. 3, two or more processors 305 can be used according to particular needs, desires, or particular implementations of the computer 302 and the described functionality. Generally, the processor 305 can execute instructions and can manipulate data to perform the operations of the computer 302, including operations using algorithms, methods, functions, processes, flows, and procedures as described in the present disclosure.

The computer 302 also includes a database 306 that can hold data for the computer 302 and other components connected to the network 330 (whether illustrated or not). For example, database 306 can be an in-memory, conventional, or a database storing data consistent with the present disclosure. In some implementations, database 306 can be a combination of two or more different database types (for example, hybrid in-memory and conventional databases) according to particular needs, desires, or particular implementations of the computer 302 and the described functionality. Although illustrated as a single database 306 in FIG. 3, two or more databases (of the same, different, or combination of types) can be used according to particular needs, desires, or particular implementations of the computer 302 and the described functionality. While database 306 is illustrated as an internal component of the computer 302, in alternative implementations, database 306 can be external to the computer 302.

The computer 302 also includes a memory 307 that can hold data for the computer 302 or a combination of components connected to the network 330 (whether illustrated or not). Memory 307 can store any data consistent with the present disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307 in FIG. 3, two or more memories 307 (of the same, different, or combination of types) can be used according to particular needs, desires, or particular implementations of the computer 302 and the described functionality. While memory 307 is illustrated as an internal component of the computer 302, in alternative implementations, memory 307 can be external to the computer 302.

The application 308 can be an algorithmic software engine providing functionality according to particular needs, desires, or particular implementations of the computer 302 and the described functionality. For example, application 308 can serve as one or more components, modules, or applications. Further, although illustrated as a single application 308, the application 308 can be implemented as multiple applications 308 on the computer 302. In addition, although illustrated as internal to the computer 302, in alternative implementations, the application 308 can be external to the computer 302.

The computer 302 can also include a power supply 314. The power supply 314 can include a rechargeable or non-rechargeable battery that can be configured to be either user- or non-user-replaceable. In some implementations, the power supply 314 can include power-conversion and management circuits, including recharging, standby, and power management functionalities. In some implementations, the power-supply 314 can include a power plug to allow the computer 302 to be plugged into a wall socket or a power source to, for example, power the computer 302 or recharge a rechargeable battery.

There can be any number of computers 302 associated with, or external to, a computer system containing computer 302, with each computer 302 communicating over network 330. Further, the terms "client," "user," and other appropriate terminology can be used interchangeably, as appropriate, without departing from the scope of the present disclosure. Moreover, the present disclosure contemplates that many users can use one computer 302 and one user can use multiple computers 302.

Described implementations of the subject matter can include one or more features, alone or in combination.

For example, in a first implementation, a computer-implemented method includes the following. Questionnaire answers corresponding to individual components of each of three elements contributing to cybersecurity risk and maturity for a computer system are received by a four-dimensional cybersecurity assurance model application. Three scores corresponding to dimensions of cybersecurity assurance for the computer system are generated by the four-dimensional cybersecurity assurance model application using the questionnaire answers. A three-dimensional graph presenting a four-dimensional model of cybersecurity assurance for the computer system is generated by the four-dimensional cybersecurity assurance model application using the three scores and temporal information.

The foregoing and other described implementations can each, optionally, include one or more of the following features:

A first feature, combinable with any of the following features, where the three scores include: a people threat (tP) score indicating a readiness of personnel responsible for cybersecurity of the computer system, including a level that personnel are skilled in and aware of relevant security procedures for the computer system; a process documentation threat (tD) score indicating a level of an existence and a completeness of process documentation defining processes used by the personnel tasked with the cybersecurity assurance for the computer system; and a technology implementation threat (tT) score based on specific testable control and test cases identified for use by the personnel and using the process documentation.

A second feature, combinable with any of the previous or following features, where the questionnaire answers and the people threat (tP) score are based on a person's knowledge of a cybersecurity assurance topic.

A third feature, combinable with any of the previous or following features, where the questionnaire answers include numeric grades for different aspects of a document.

A fourth feature, combinable with any of the previous or following features, where the questionnaire answers and the process documentation threat (tD) score are based on a person's knowledge of a cybersecurity assurance topic.

A fifth feature, combinable with any of the previous or following features, where the questionnaire answers include numeric grades for no process document, document exists but is mostly incomplete, document exists and is mostly complete, and complete process document exists.

A sixth feature, combinable with any of the previous or following features, where the questionnaire answers and the technology implementation threat (tT) score are based on passing or failing a test case.

A seventh feature, combinable with any of the previous or following features, three-dimensional graph presenting the four-dimensional model of cybersecurity assurance for the computer system includes points plotted relative to a people axis, a process documentation axis, and a technology implementation axis, and where the points are annotated with the three scores and a time element.

An eighth feature, combinable with any of the previous or following features, where providing an animation of information presented in the three-dimensional graph to improve visualization of information relative to the people axis, the process documentation axis, and the technology implementation axis, where the animation animates a change in the cybersecurity assurance for the computer system over time.

In a second implementation, a non-transitory, computer-readable medium stores one or more instructions executable by a computer system to perform operations including the following. Questionnaire answers corresponding to individual components of each of three elements contributing to cybersecurity risk and maturity for a computer system are received by a four-dimensional cybersecurity assurance model application. Three scores corresponding to dimensions of cybersecurity assurance for the computer system are generated by the four-dimensional cybersecurity assurance model application using the questionnaire answers. A three-dimensional graph presenting a four-dimensional model of cybersecurity assurance for the computer system is generated by the four-dimensional cybersecurity assurance model application using the three scores and temporal information.

The foregoing and other described implementations can each, optionally, include one or more of the following features:

A first feature, combinable with any of the following features, where the three scores include: a people threat (tP) score indicating a readiness of personnel responsible for cybersecurity of the computer system, including a level that personnel are skilled in and aware of relevant security procedures for the computer system; a process documentation threat (tD) score indicating a level of an existence and a completeness of process documentation defining processes used by the personnel tasked with the cybersecurity assurance for the computer system; and a technology implementation threat (tT) score based on specific testable control and test cases identified for use by the personnel and using the process documentation.

A second feature, combinable with any of the previous or following features, where the questionnaire answers and the people threat (tP) score are based on a person's knowledge of a cybersecurity assurance topic.

A third feature, combinable with any of the previous or following features, where the questionnaire answers include numeric grades for different aspects of a document.

A fourth feature, combinable with any of the previous or following features, where the questionnaire answers and the process documentation threat (tD) score are based on a person's knowledge of a cybersecurity assurance topic.

A fifth feature, combinable with any of the previous or following features, where the questionnaire answers include numeric grades for no process document, document exists but is mostly incomplete, document exists and is mostly complete, and complete process document exists.

A sixth feature, combinable with any of the previous or following features, where the questionnaire answers and the technology implementation threat (tT) score are based on passing or failing a test case.

A seventh feature, combinable with any of the previous or following features, three-dimensional graph presenting the four-dimensional model of cybersecurity assurance for the computer system includes points plotted relative to a people axis, a process documentation axis, and a technology implementation axis, and where the points are annotated with the three scores and a time element.

An eighth feature, combinable with any of the previous or following features, where providing an animation of information presented in the three-dimensional graph to improve visualization of information relative to the people axis, the process documentation axis, and the technology implementation axis, where the animation animates a change in the cybersecurity assurance for the computer system over time.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. Questionnaire answers corresponding to individual components of each of three elements contributing to cybersecurity risk and maturity for a computer system are received by a four-dimensional cybersecurity assurance model application. Three scores corresponding to dimensions of cybersecurity assurance for the computer system are generated by the four-dimensional cybersecurity assurance model application using the questionnaire answers. A three-dimensional graph presenting a four-dimensional model of cybersecurity assurance for the computer system is generated by the four-dimensional cybersecurity assurance model application using the three scores and temporal information.

The foregoing and other described implementations can each, optionally, include one or more of the following features:

A first feature, combinable with any of the following features, where the three scores include: a people threat (tP) score indicating a readiness of personnel responsible for cybersecurity of the computer system, including a level that personnel are skilled in and aware of relevant security procedures for the computer system; a process documentation threat (tD) score indicating a level of an existence and a completeness of process documentation defining processes used by the personnel tasked with the cybersecurity assurance for the computer system; and a technology implementation threat (tT) score based on specific testable control and test cases identified for use by the personnel and using the process documentation.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:

receiving, by a four-dimensional cybersecurity assurance model application, questionnaire answers corresponding to individual components of each of three elements contributing to cybersecurity risk and maturity for a computer system of a production environment comprising an equipment and systems for managing oil wells;

generating, by the four-dimensional cybersecurity assurance model application and using the questionnaire answers, three scores corresponding to three dimensions of cybersecurity assurance for the computer system;

generating, by the four-dimensional cybersecurity assurance model application and using the three scores and temporal information, a three-dimensional graph presenting a four-dimensional model of cybersecurity assurance for the computer system, the three-dimensional graph comprising markings highlighting the three scores relative to axes of the three-dimensional graph, the markings moving in coordination with the three scores during animations, the markings highlighting varying in color depending on percentages of the cybersecurity risk and the maturity of the computer system relative to a pre-defined set of boundary conditions, the pre-defined set of boundary conditions being adjusted based on processes and technical controls of the production environment; and outputting, to the equipment or the systems, an automated adjustment of a cyber-security control.

2. The computer-implemented method of claim 1, wherein the three scores comprise:
  a people threat (tP) score indicating a readiness of personnel responsible for cybersecurity of the computer system, comprising a level that personnel are skilled in and aware of relevant security procedures for the computer system;
  a process documentation threat (tD) score indicating a level of an existence and a completeness of process documentation defining processes used by the personnel tasked with the cybersecurity assurance for the computer system; and
  a technology implementation threat (tT) score based on specific testable control and test cases identified for use by the personnel and using a process documentation.

3. The computer-implemented method of claim 2, wherein the questionnaire answers and the people threat (tP) score are based on a person's knowledge of a cybersecurity assurance topic.

4. The computer-implemented method of claim 2, wherein the questionnaire answers and the process documentation threat (tD) score are based on a person's knowledge of a cybersecurity assurance topic.

5. The computer-implemented method of claim 4, wherein the questionnaire answers comprise numeric grades for no process document, document exists but is mostly incomplete, document exists and is mostly complete, and complete process document exists.

6. The computer-implemented method of claim 2, wherein the questionnaire answers and the technology implementation threat (tT) score are based on passing or failing a test case.

7. The computer-implemented method of claim 1, wherein the questionnaire answers comprise numeric grades for different aspects of a document.

8. The computer-implemented method of claim 1, wherein three-dimensional graph presenting the four-dimensional model of cybersecurity assurance for the computer system comprise points plotted relative to a people axis, a process documentation axis, and a technology implementation axis, and wherein the points are annotated with the three scores and a time element.

9. The computer-implemented method of claim 8, further comprising:
  providing an animation of information presented in the three-dimensional graph to improve visualization of information relative to the people axis, the process documentation axis, and the technology implementation axis, wherein the animation animates a change in the cybersecurity assurance for the computer system over time.

10. A non-transitory, computer-readable medium storing one or more instructions executable by a computer system to perform operations comprising:
  receiving, by a four-dimensional cybersecurity assurance model application, questionnaire answers corresponding to individual components of each of three elements contributing to cybersecurity risk and maturity for a computer system of a production environment comprising an equipment and systems for managing oil wells;
  generating, by the four-dimensional cybersecurity assurance model application and using the questionnaire answers, three scores corresponding to three dimensions of cybersecurity assurance for the computer system;
  generating, by the four-dimensional cybersecurity assurance model application and using the three scores and temporal information, a three-dimensional graph presenting a four-dimensional model of cybersecurity assurance for the computer system, the three-dimensional graph comprising markings highlighting the three scores relative to axes of the three-dimensional graph, the markings moving in coordination with the three scores during animations, the markings highlighting varying in color depending on percentages of the cybersecurity risk and the maturity of the computer system relative to a pre-defined set of boundary conditions, the pre-defined set of boundary conditions being adjusted based on processes and technical controls of the production environment; and
  outputting, to the equipment or the systems, an automated adjustment of a cyber-security control.

11. The non-transitory, computer-readable medium of claim 10, wherein the three scores comprise:
  a people threat (tP) score indicating a readiness of personnel responsible for cybersecurity of the computer system, comprising a level that personnel are skilled in and aware of relevant security procedures for the computer system;
  a process documentation threat (tD) score indicating a level of an existence and a completeness of process documentation defining processes used by the personnel tasked with the cybersecurity assurance for the computer system; and
  a technology implementation threat (tT) score based on specific testable control and test cases identified for use by the personnel and using a process documentation.

12. The non-transitory, computer-readable medium of claim 11, wherein the questionnaire answers and the people threat (tP) score are based on a person's knowledge of a cybersecurity assurance topic.

13. The non-transitory, computer-readable medium of claim 11, wherein the questionnaire answers and the process documentation threat (tD) score are based on a person's knowledge of a cybersecurity assurance topic.

14. The non-transitory, computer-readable medium of claim 13, wherein the questionnaire answers comprise numeric grades for no process document, document exists but is mostly incomplete, document exists and is mostly complete, and complete process document exists.

15. The non-transitory, computer-readable medium of claim 11, wherein the questionnaire answers and the technology implementation threat (tT) score are based on passing or failing a test case.

16. The non-transitory, computer-readable medium of claim 10, wherein the questionnaire answers comprise numeric grades for different aspects of a document.

17. The non-transitory, computer-readable medium of claim 10, wherein three-dimensional graph presenting the four-dimensional model of cybersecurity assurance for the computer system comprises points plotted relative to a people axis, a process documentation axis, and a technology implementation axis, and wherein the points are annotated with the three scores and a time element.

18. The non-transitory, computer-readable medium of claim 17, the operations further comprising:
  providing an animation of information presented in the three-dimensional graph to improve visualization of information relative to the people axis, the process documentation axis, and the technology implementation axis, wherein the animation animates a change in the cybersecurity assurance for the computer system over time.

19. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
receiving, by a four-dimensional cybersecurity assurance model application, questionnaire answers corresponding to individual components of each of three elements contributing to cybersecurity risk and maturity for a computer system of a production environment comprising an equipment and systems for managing oil wells;
generating, by the four-dimensional cybersecurity assurance model application and using the questionnaire answers, three scores corresponding to three dimensions of cybersecurity assurance for the computer system;
generating, by the four-dimensional cybersecurity assurance model application and using the three scores and temporal information, a three-dimensional graph presenting a four-dimensional model of cybersecurity assurance for the computer system, the three-dimensional graph comprising markings highlighting the three scores relative to axes of the three-dimensional graph, the markings moving in coordination with the three scores during animations, the markings highlighting varying in color depending on percentages of the cybersecurity risk and the maturity of the computer system relative to a pre-defined set of boundary conditions, the pre-defined set of boundary conditions being adjusted based on processes and technical controls of the production environment; and
outputting, to the equipment or the systems, an automated adjustment of a cyber-security control.

20. The computer-implemented system of claim 19, wherein the three scores comprise:
a people threat (tP) score indicating a readiness of personnel responsible for cybersecurity of the computer system, comprising a level that personnel are skilled in and aware of relevant security procedures for the computer system;
a process documentation threat (tD) score indicating a level of an existence and a completeness of process documentation defining processes used by the personnel tasked with the cybersecurity assurance for the computer system; and
a technology implementation threat (tT) score based on specific testable control and test cases identified for use by the personnel and using a process documentation.

* * * * *